United States Patent
Huang et al.

(10) Patent No.: US 12,453,602 B2
(45) Date of Patent: Oct. 28, 2025

(54) ULTRASONIC PUNCTURE GUIDANCE PLANNING SYSTEM BASED ON MULTI-MODAL MEDICAL IMAGE REGISTRATION USING AN ITERATIVE CLOSEST POINT ALGORITHM

(71) Applicant: Carbon (Shenzhen) Medical Device Co, Ltd., Shenzhen (CN)

(72) Inventors: Xiongwen Huang, Shenzhen (CN); Rongliang Zhu, Shenzhen (CN); Shanshan Wang, Shenzhen (CN); Pablo David Burstein, Shenzhen (CN); Mengling Wu, Shenzhen (CN)

(73) Assignee: Carbon (Shenzhen) Medical Device Co, Ltd., Shenzhen (CN)

(*) Notice: Subject to any disclaimer, the term of this patent is extended or adjusted under 35 U.S.C. 154(b) by 242 days.

(21) Appl. No.: 18/224,064

(22) Filed: Jul. 20, 2023

(65) Prior Publication Data
US 2024/0115322 A1   Apr. 11, 2024

(30) Foreign Application Priority Data
Oct. 8, 2022 (CN) .......... 202211219688.3

(51) Int. Cl.
*A61B 34/10* (2016.01)
*A61B 8/00* (2006.01)
(Continued)

(52) U.S. Cl.
CPC .......... *A61B 34/10* (2016.02); *A61B 8/4254* (2013.01); *A61B 8/463* (2013.01); *A61B 8/5261* (2013.01);
(Continued)

(58) Field of Classification Search
CPC ...... A61B 17/3403; A61B 2017/00274; A61B 2562/0223; A61B 34/10; A61B 34/20;
(Continued)

(56) References Cited

U.S. PATENT DOCUMENTS

| | | | |
|---|---|---|---|
| 2010/0208963 A1* | 8/2010 | Kruecker | A61B 8/4254 382/131 |
| 2011/0134113 A1* | 6/2011 | Ma | A61B 8/4245 345/419 |

(Continued)

FOREIGN PATENT DOCUMENTS

| | | | |
|---|---|---|---|
| CN | 103356284 A | | 10/2013 |
| CN | 103860197 A | * | 3/2014 |

(Continued)

OTHER PUBLICATIONS

UroNav 4.1 Instructions for Use (dated May 16, 2022) (Year: 2022).*

*Primary Examiner* — Serkan Akar
*Assistant Examiner* — Jason P Gross
(74) *Attorney, Agent, or Firm* — Bayramoglu Law Offices LLC

(57) ABSTRACT

An ultrasonic puncture guidance planning system based on a multi-modal medical image registration, which includes: an MRI sequence image rendering unit configured to receive MRI sequence images, and perform three-dimensional rendering and plot puncture points; an ultrasound sequence image reconstruction unit configured to receive ultrasound sequence images and reconstruct ultrasound volume data; a registration unit configured to perform a three-dimensional registration operation to obtain a registration transformation coefficient; and a puncture planning unit configured to receive ultrasound images of a human body acquired by an ultrasound probe, and generate and display a puncture planning image according to a system puncture point and a (Continued)

current ultrasonic image. An electromagnetic coordinate system under ultrasound is unified to a MRI world coordinate system through a multi-modal medical image registration, and it is determined whether the puncture point is on the ultrasound plane to guide the ultrasound for accurate puncture.

17 Claims, 4 Drawing Sheets

(51) Int. Cl.
*A61B 17/34* (2006.01)
*G06T 5/70* (2024.01)
*G06T 7/33* (2017.01)
*G06T 7/38* (2017.01)
*G06T 15/08* (2011.01)
*G06T 17/20* (2006.01)
*G16H 30/20* (2018.01)
*G16H 30/40* (2018.01)

(52) U.S. Cl.
CPC ............ *A61B 17/3403* (2013.01); *G06T 5/70* (2024.01); *G06T 7/344* (2017.01); *G06T 7/38* (2017.01); *G06T 15/08* (2013.01); *G06T 17/20* (2013.01); *G16H 30/20* (2018.01); *G16H 30/40* (2018.01); *A61B 2017/3411* (2013.01); *A61B 2017/3413* (2013.01); *G06T 2207/10016* (2013.01); *G06T 2207/10028* (2013.01); *G06T 2207/10088* (2013.01); *G06T 2207/10132* (2013.01); *G06T 2207/30096* (2013.01); *G06T 2207/30196* (2013.01); *G06T 2210/41* (2013.01); *G06T 2210/56* (2013.01)

(58) Field of Classification Search
CPC ..... A61B 34/25; G06T 17/20; G06T 2210/41; G06T 2210/56; G06T 5/70; G16H 30/20; G16H 30/40
See application file for complete search history.

(56) References Cited

U.S. PATENT DOCUMENTS

| | | | |
|---|---|---|---|
| 2013/0310680 A1* | 11/2013 | Werahera | A61B 5/0035 600/478 |
| 2013/0338477 A1* | 12/2013 | Glossop | A61B 10/0241 600/407 |
| 2014/0073907 A1* | 3/2014 | Kumar | A61B 10/0241 600/407 |
| 2015/0133784 A1* | 5/2015 | Kapoor | A61B 8/5246 600/438 |
| 2015/0366535 A1* | 12/2015 | Eggers | A61B 8/4245 382/131 |
| 2018/0132944 A1* | 5/2018 | Yan | A61B 8/12 |
| 2020/0108222 A1* | 4/2020 | Bianco | A61N 7/022 |
| 2022/0133284 A1* | 5/2022 | Lampotang | A61B 10/0241 600/562 |
| 2022/0179027 A1* | 6/2022 | Kawata | G01R 33/5608 |

FOREIGN PATENT DOCUMENTS

| | | | |
|---|---|---|---|
| CN | 105869218 A | * | 8/2016 |
| CN | 107028626 A | | 8/2017 |
| CN | 108577940 A | | 9/2018 |
| CN | 114119549 A | | 3/2022 |
| WO | 2021094354 A1 | | 5/2021 |

* cited by examiner

C plane (cross section)

ULTRASONIC PUNCTURE GUIDANCE PLANNING SYSTEM BASED ON MULTI-MODAL MEDICAL IMAGE REGISTRATION USING AN ITERATIVE CLOSEST POINT ALGORITHM

CROSS-REFERENCE TO THE RELATED APPLICATION

This application is based upon and claims priority to Chinese Patent Application No. 202211219688.3 filed on Oct. 8, 2022, the entire content of which is incorporated herein by reference.

TECHNICAL FIELD

The present invention belongs to the technical field of image processing, in particular relates to an ultrasonic puncture guidance planning system based on a multi-modal medical image registration.

BACKGROUND

With the development of science and technology, medical imaging technologies have developed rapidly in recent years, and mainly involve CT images, MRI images and ultrasound images. Due to different characteristics of respective images, the CT images are excellent in developing bony structures, while the MRI images are excellent in developing soft tissues, and the ultrasound images have characteristic of real-time feedback. Therefore, more and more clinical attention has been focused on finding and locating lesions more accurately through multi-modal medical image registration and fusion.

Because ultrasound can display an internal tissue structure of a human body in real time, ultrasonic puncture guidance technology has emerged. This technology is a clinical technology to puncture target sites in vivo under monitoring and guidance of real-time ultrasound images. It is a clinical pain point and difficulty to accurately penetrate a needle into a target site for treatment or to suck out a small number of cells or tissues for pathological examination, reduce damage of puncture to surrounding tissues, and puncture in a shortest time so as to avoid caused serious complications.

Ultrasonic puncture guidance can display movement of a puncture needle in tissues in real time and provide a basis for choice of a puncture path, which is an important means of ultrasound-assisted treatment. However, conventional ultrasound-guided puncture relies heavily on operators' experience and performance of ultrasonic equipment, which may result in problems such as more punctures and longer operation time, thus resulting in increased incidence of complications.

To this end, an ultrasonic puncture guidance planning system based on a multi-modal medical image registration is provided to solve above problems.

SUMMARY

Aiming at problems that conventional ultrasound-guided puncture relies heavily on operators' experience and performance of ultrasonic equipment, and the situation requiring more punctures and longer operation time may occur, which may easily result in increased incidence of complications, an objective of the present invention is to provide an ultrasonic puncture guidance planning system based on a multi-modal medical image registration.

Technical solutions of the present invention are as follows.

The present invention provides an ultrasonic puncture guidance planning system based on a multi-modal medical image registration, which includes:
 an MRI sequence image rendering unit configured to receive magnetic resonance imaging sequence images of a human body, namely MRI sequence images, and perform three-dimensional rendering on the MRI sequence images and plot a puncture point;
 an ultrasound sequence image reconstruction unit configured to receive ultrasound sequence images of the human body, extract three-dimensional coordinates of four vertices of each frame of the ultrasound sequence images, and reconstruct ultrasound volume data;
 a registration unit configured to perform a three-dimensional registration operation on the reconstructed ultrasound volume data and rendered MRI data by using an ICP iterative algorithm to obtain a registration transformation coefficient, the registration transformation coefficient being used for transforming three-dimensional coordinates corresponding to ultrasound data into three-dimensional coordinates corresponding to MRI data; and
 a puncture planning unit configured to receive ultrasound images of the human body acquired by an ultrasound probe, and generate and display a puncture planning image according to a system puncture point and a current ultrasound image.

Further, the MRI sequence images of the human body are acquired by using large-scale magnetic resonance imaging equipment.

Further, the MRI sequence image rendering unit performs three-dimensional reconstruction and rendering to acquire image information according to patient position information in digital imaging and communications in medicine (DICOM) information of the MRI sequence images, and plots the puncture point according to the image information.

Further, the puncture point includes a system puncture point and/or a targeted puncture point, 12 system puncture points are evenly distributed on the image information obtained by the three-dimensional reconstruction and rendering, and the targeted puncture point is a position where a suspected lesion is located.

Further, a puncture plate is provided at a handle position of the ultrasound probe, the puncture plate is provided with a plurality of needle access holes, the needle access holes are evenly arranged, and a size of the puncture plate can cover a size of a puncture organ (such as prostate); and an ultrasonic display plane is numbered according to actual positions and spacings of respective holes on the puncture plate.

Further, the ultrasound sequence images of the human body are a group of ultrasound sequence images manually collected by continuously rotating the ultrasound probe, an electromagnetic sensor is bound to the ultrasound probe, and the electromagnetic sensor is connected with an electromagnetic positioning system for acquiring three-dimensional coordinates of vertices of the ultrasound sequence images.

Further, the reconstructing ultrasound volume data specifically includes:
 using a following coordinate transformation formula to obtain three-dimensional coordinates corresponding to respective pixels in each frame of ultrasound sequence images based on three-dimensional coordinates and pixel coordinates of four vertices of each frame of the ultrasound sequence images, so as to obtain a three-dimensional source point cloud of the ultrasound data:

$$P(x,y,z)=Q(x,y,z)+uH(x,y,z)+vK(x,y,z),$$

where, (u, v) is a pixel coordinate of the ultrasound sequence image, P(x, y, z) is a transformed three-dimensional coordinate, Q is a three-dimensional coordinate of an upper left vertex in the ultrasound image, H is a x-direction vector of a three-dimensional space, and K is a y-direction vector of the three-dimensional space; and performing above transformation on each frame of ultrasound images and getting three-dimensional coordinates of all pixel points in respective frames of images, calculating three-dimensional coordinates corresponding to a same pixel position in both preceding and following frames of images, then transforming the three-dimensional coordinates into a voxel position, and performing interpolation on a cross section where a point cloud of the same pixel position in the preceding and following frames of images is located, so as to obtain the reconstructed ultrasound volume data.

Further, the registration unit performs the following operations:

performing triangle mesh processing and smoothing operation on the reconstructed ultrasound volume data, and down-sampling to obtain a three-dimensional source point cloud of the reconstructed ultrasound volume data; and performing structural pairing on the three-dimensional source point cloud of the reconstructed ultrasound volume data and a three-dimensional target point cloud of the image information after MRI sequence rendering using a KNN tree, determining corresponding point pairs of the three-dimensional source point cloud and the three-dimensional target point cloud, and performing ICP iteration to complete registration, so as to obtain the registration transformation coefficient, the registration transformation coefficient including a registration rotation matrix R and a registration translation amount T.

Further, the puncture planning unit performs the following steps:

constructing a sphere with a radius of r for each of the system puncture points, and uniformly sampling a plurality of points on a surface of the sphere;

receiving an ultrasound image of the human body acquired by the ultrasound probe and extracting three-dimensional coordinates of four vertices of the image;

traversing a spatial position relationship between a sampling point on the surface of the sphere constructed by the puncture point and a current probe plane for each puncture point, and acquiring the puncture point on the current ultrasound image;

projecting three-dimensional coordinates of the puncture point on the ultrasound image, extracting a corresponding needle access hole number of the puncture point on the ultrasound image, and generating a puncture planning image, namely plotting the current puncture point and a puncture guide line and highlighting a corresponding needle access hole on the two-dimensional current ultrasound image; and realizing an accurate puncture according to the puncture guide line and the needle access hole number.

Further, in the puncture planning unit:

acquiring the puncture point on the current ultrasound image specifically includes the following steps:

acquiring a space vector formed by the sampling point and the upper left vertex of the ultrasound image;

acquiring a normal vector of an ultrasound image space, namely of vertices p0 to p3;

calculating a cosine value of an included angle between the space vector and the normal vector; and comparing the calculated cosine value with a set threshold value, and if the cosine value is less than the threshold value, determining that the puncture point is on the current ultrasound image, the threshold value being 0.01 to 0.02.

Further, in the puncture planning unit:

the projecting the three-dimensional coordinates of the puncture point onto the ultrasound image specifically includes:

transforming puncture point MRI data into three-dimensional coordinates corresponding to the ultrasound volume data according to the registration transformation coefficient; and projecting puncture point ultrasound volume data to a sagittal plane of the current ultrasound image according to three-dimensional coordinates Pi(x, y, z) of the puncture point ultrasound volume data, which includes the following steps:

firstly, calculating a direction vector vec(x-x0, y-y0, z-z0) between the puncture point Pi(x, y, z) and the upper left vertex p3(x0, y0, z0) of the current ultrasound image, i representing a number of the puncture point;

secondly, calculating a projection value of the vector vec in a x direction of an ultrasound plane, so as to obtain a physical distance value of the puncture point from the upper left vertex of the ultrasound image in the x direction: Value: Value=vec·H, H being a unit vector of the ultrasound plane in the x direction;

finally, calculating a pixel coordinate X of the puncture point in the x direction of the ultrasound plane according to a physical spacing pixelSpace of an ultrasonic pixel: X=Value/pixelSpace; and calculating a projection coordinate of the puncture point in a y direction of the ultrasound plane in a same way as above.

Further, the system further includes a puncture guiding unit. The puncture guiding unit is configured to receive real-time ultrasound images of the human body acquired by the ultrasound probe in real time, execute the puncture planning unit for puncture planning, and display the ultrasound images and the puncture planning images in real time.

The present invention has the following beneficial effects.

According to the present invention, an electromagnetic system under ultrasound (namely, two-dimensional coordinates) is unified to a MRI world coordinate system (namely, three-dimensional coordinates) through multi-modal medical image registration, and is switched to the MRI coordinate system through an ultrasound section, and it is determined whether the puncture point is on the ultrasound plane. The puncture point located on the ultrasound plane is transformed into the two-dimensional coordinates, and a guide map is planned on the ultrasound plane for the accurate puncture. As a result, precision and accuracy of puncture guidance are further improved, which can assist doctors to puncture a lesion target faster and effectively reduce puncture time and incidence of complications.

Other features and advantages of the present invention will be described in detail in the following detailed description.

BRIEF DESCRIPTION OF THE DRAWINGS

The above and other objectives, features and advantages of the present invention will become more apparent by describing exemplary embodiments of the present invention in more detail in combination with the accompanying drawings, in which like reference numerals commonly represent like parts in the exemplary embodiments of the present invention.

DETAILED DESCRIPTION OF THE EMBODIMENTS

Figure 1:
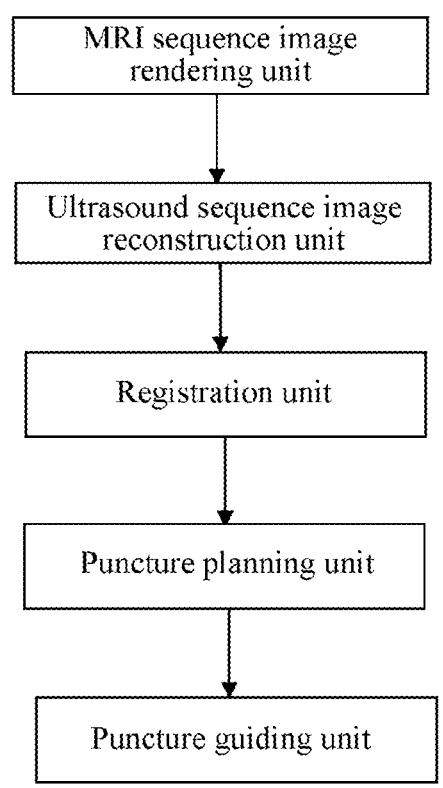
FIG. 1 is a structural diagram of a system according to the present invention.

Preferred embodiments of the present invention will be described in more detail below with reference to the accompanying drawings. Although preferred embodiments of the present invention are shown in the drawings, it should be understood that the present invention can be implemented in various forms and should not be limited by the embodiments set forth herein.

The present invention provides an ultrasonic puncture guidance planning system based on a multi-modal medical image registration, which includes an MRI sequence image rendering unit, an ultrasound sequence image reconstruction unit, a registration unit and a puncture planning unit.

The MRI sequence image rendering unit is configured to receive magnetic resonance imaging sequence images of a human body, namely MRI sequence images, and perform three-dimensional rendering on the MRI sequence images and plot a puncture point.

The MRI sequence images of the human body are acquired by using large-scale magnetic resonance imaging equipment. The MRI sequence image rendering unit performs three-dimensional reconstruction and rendering to acquire image information according to patient position information in digital imaging and communications in medicine (DICOM) information of the MRI sequence images, and plots the puncture point according to the image information. The puncture point includes a system puncture point and/or a targeted puncture point. 12 system puncture points are evenly distributed on the image information obtained by the three-dimensional reconstruction and rendering, or set according to consensus of prostate puncture experts in China. The targeted puncture point is a position where a suspected lesion is located, which is determined by operators or doctors.

The ultrasound sequence image reconstruction unit is configured to receive ultrasound sequence images of the human body, extract three-dimensional coordinates of four vertices of each frame of the ultrasound sequence images, and reconstruct ultrasound volume data.

Figure 2:
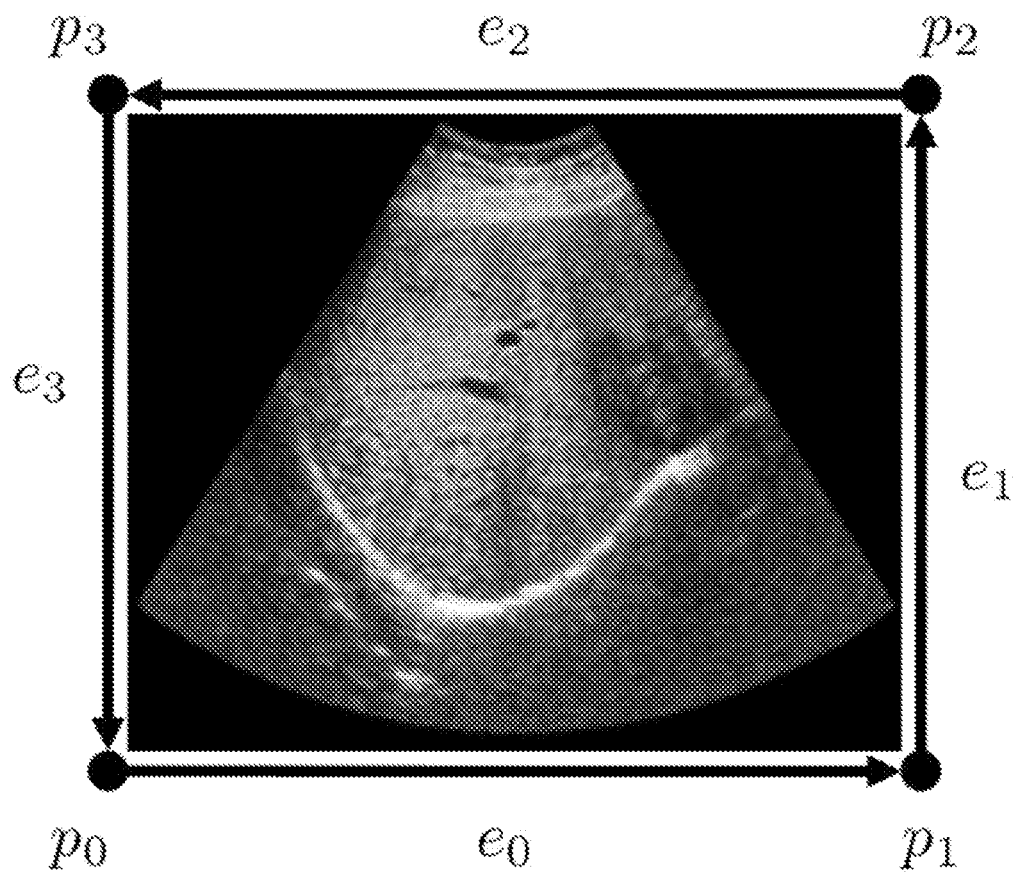
FIG. 2 is a schematic diagram of an ultrasound sequence image and vertex coordinates thereof.
Figure 5:
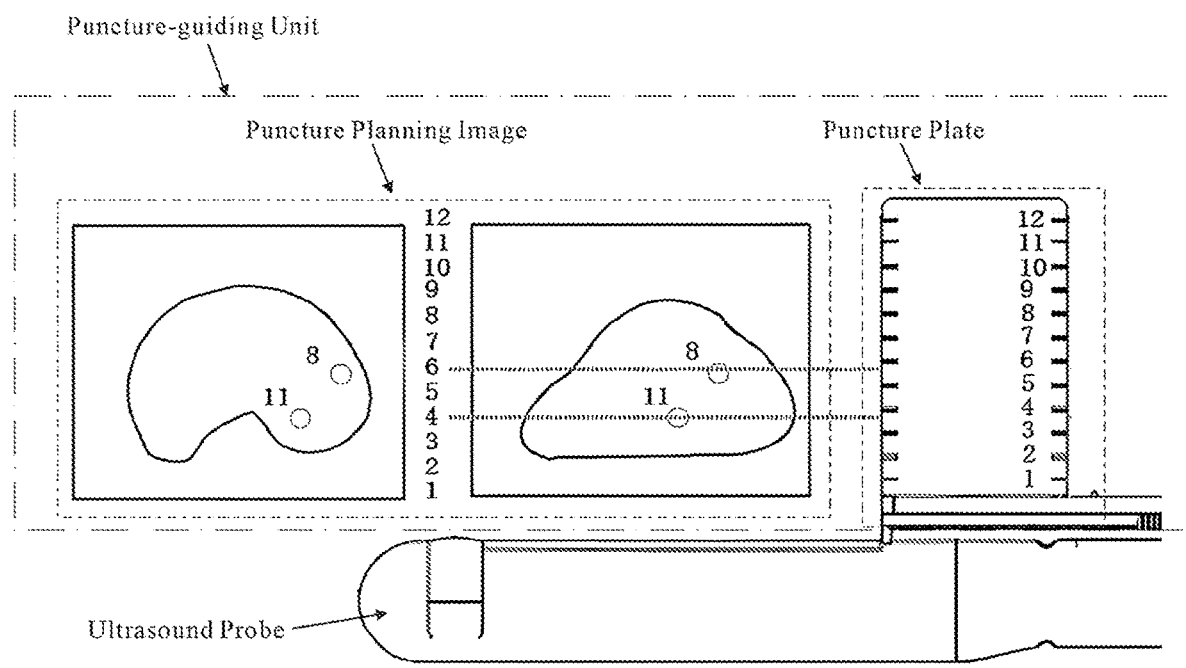
FIG. 5 is a schematic diagram of ultrasonic puncture guidance in a manner that a baffle corresponds to an ultrasonic sagittal plane in different numbers.

A puncture plate is provided at a handle position of the ultrasound probe as shown in FIG. 5. The puncture plate is provided with a plurality of needle access holes. The needle access holes are evenly arranged. A size of the puncture plate can cover a size of a puncture organ (such as prostate). An ultrasonic display plane is numbered according to actual positions and spacings of respective holes on the puncture plate. The ultrasound sequence images of the human body are a group of ultrasound sequence images manually collected by continuously rotating the ultrasound probe as shown in FIG. 2. An electromagnetic sensor is bound to the ultrasound probe. The electromagnetic sensor is connected with an electromagnetic positioning system for acquiring three-dimensional coordinates of vertices of the ultrasound sequence images.

The reconstructing ultrasound volume data specifically includes:

using a following coordinate transformation formula to obtain three-dimensional coordinates corresponding to respective pixels in each frame of ultrasound sequence images based on three-dimensional coordinates and pixel coordinates of four vertices of each frame of the ultrasound sequence images, so as to obtain a three-dimensional source point cloud of the ultrasound data:

$$P(x,y,z)=Q(x,y,z)+uH(x,y,z)+vK(x,y,z),$$

where, (u, v) is a pixel coordinate of the ultrasound sequence image, $P(x, y, z)$ is a transformed three-dimensional coordinate, Q is a three-dimensional coordinate of an upper left vertex in the ultrasound image, H is a x-direction vector of a three-dimensional space, and K is a y-direction vector of the three-dimensional space; and performing above transformation on each frame of ultrasound images and getting three-dimensional coordinates of all pixel points in respective frames of images, calculating three-dimensional coordinates corresponding to a same pixel position in both preceding and following frames of images, then transforming the three-dimensional coordinates into a voxel position, and performing interpolation on a cross section where a point cloud of the same pixel position in the preceding and following frames of images is located, so as to obtain the reconstructed ultrasound volume data.

The registration unit is configured to perform a three-dimensional registration operation on the reconstructed ultrasound volume data and rendered MRI data by using an ICP iterative algorithm to obtain a registration transformation coefficient. The registration transformation coefficient is used for transforming three-dimensional coordinates corresponding to ultrasound data into three-dimensional coordinates corresponding to MRI data. The registration unit specifically performs the following operations:

performing triangle mesh processing and smoothing operation on the reconstructed ultrasound volume data, and down-sampling to obtain a three-dimensional source point cloud of the reconstructed ultrasound volume data; and performing structural pairing on the three-dimensional source point cloud of the reconstructed ultrasound volume data and a three-dimensional target point cloud of the image information after MRI sequence rendering using a KNN tree, determining corresponding point pairs of the three-dimensional source point cloud and the three-dimensional target point cloud, and performing ICP iteration to complete registration, so as to obtain the registration transformation coefficient, the registration transformation coefficient including a registration rotation matrix R and a registration translation amount T.

The puncture planning unit is configured to receive ultrasound images of the human body acquired by the ultrasound probe, and generate and display a puncture planning image according to the system puncture point and a current ultrasound image. The puncture planning unit specifically performs the following steps:

constructing a sphere with a radius of r for each of the system puncture points, and uniformly sampling a plurality of points on a surface of the sphere;

receiving an ultrasound image of the human body acquired by the ultrasound probe and extracting three-dimensional coordinates of four vertices of the image; and traversing a spatial position relationship between a sampling point on the surface of the sphere constructed by the puncture point and a current probe plane for each puncture point, and acquiring the puncture point on the current ultrasound image, which specifically includes:

firstly, acquiring a space vector formed by the sampling point and the upper left vertex of the ultrasound image;

secondly, acquiring a normal vector of an ultrasound image space, namely of vertices p0 to p3;

thirdly, calculating a cosine value of an included angle between the space vector and the normal vector; and finally, comparing the calculated cosine value with a set threshold value, and if the cosine value is less than the threshold value, determining that the puncture point is on the current ultrasound image, the threshold value being 0.01 to 0.02.

Three-dimensional coordinates of the puncture point are projected on the ultrasound image, a corresponding needle access hole number of the puncture point on the ultrasound image is extracted, and a puncture planning image is generated, namely the current puncture point and a puncture guide line are plotted and a corresponding needle access hole is highlighted on the two-dimensional current ultrasound image. The projecting the three-dimensional coordinates of the puncture point on the ultrasound image specifically includes:

transforming puncture point MRI data into three-dimensional coordinates corresponding to the ultrasound volume data according to the registration transformation coefficient; and projecting puncture point ultrasound volume data to a sagittal plane of the current ultrasound image according to three-dimensional coordinates Pi(x, y, z) of the puncture point ultrasound volume data, which includes the following steps:

firstly, calculating a direction vector vec(x-x0, y-y0, z-z0) between the puncture point Pi(x, y, z) and the upper left vertex p3(x0, y0, z0) of the current ultrasound image, i representing a number of the puncture point;

secondly, calculating a projection value of the vector vec in a x direction of an ultrasound plane, so as to obtain a physical distance value of the puncture point from the upper left vertex of the ultrasound image in the x direction: Value: Value=vec·H, H being a unit vector of the ultrasound plane in the x direction;

finally, calculating a pixel coordinate X of the puncture point in the x direction of the ultrasound plane according to a physical spacing pixelSpace of an ultrasonic pixel: X=Value/pixelSpace; and calculating a projection coordinate of the puncture point in a y direction of the ultrasound plane in a same way as above.

An accurate puncture is realized according to the puncture guide line and the needle access hole number.

The ultrasonic puncture guidance planning system based on a multi-modal medical image registration of the present invention further includes a puncture guiding unit. The puncture guiding unit is configured to receive real-time ultrasound images of the human body acquired by the ultrasound probe in real time, execute the puncture planning unit for puncture planning, and display the ultrasound images and the puncture planning images in real time.

In a specific implementation, as shown in FIG. 1 to FIG. 7, the ultrasonic puncture guidance planning system based on a multi-modal medical image registration of the present invention is applied to ultrasonic prostate puncture guidance planning, and performs the following steps:

S1: The MRI sequence image rendering unit is adopted to receive magnetic resonance imaging sequence images of a human body, namely MRI sequence images, and perform three-dimensional rendering on the MRI sequence images and plot a puncture point.

Figure 3:
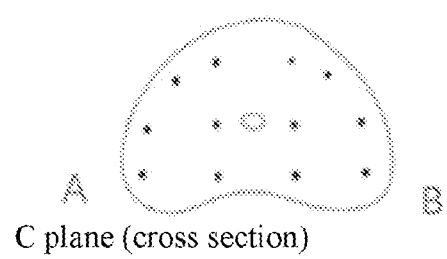
FIG. 3 is a schematic diagram of distribution of puncture points in a prostate cross section.
Figure 4:
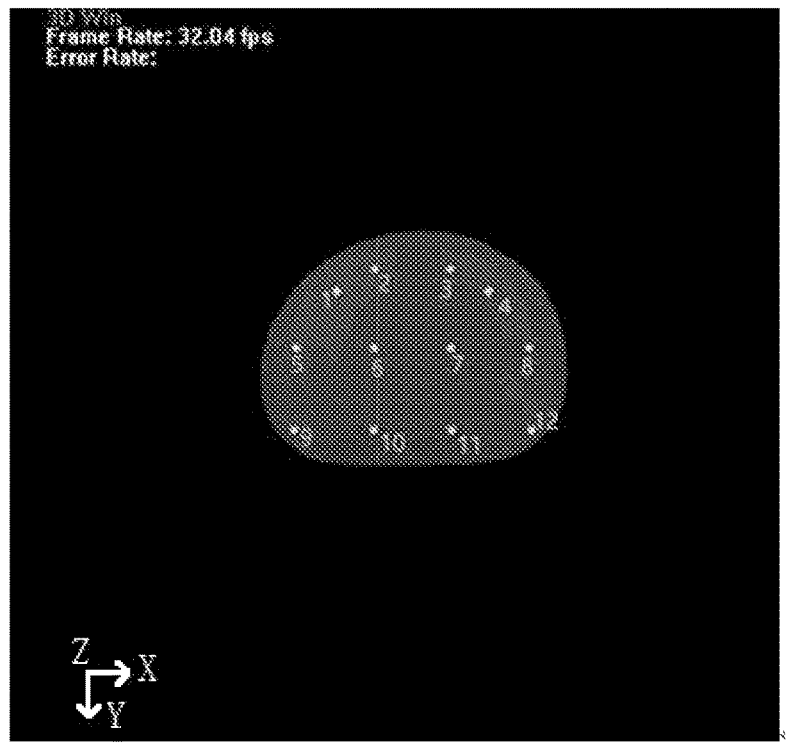
FIG. 4 is a schematic diagram of prostate MRI rendering.

According to patient position information in digital imaging and communications in medicine (DICOM) information and combining with the patient's image position information in the digital imaging and communications in medicine (DICOM) information at the same time, three-dimensional reconstruction and rendering is performed. Taking human prostate as an example, system and targeted (determined by operators or doctors if any) puncture points are plotted according to image information (as shown in FIG. 4, it is a schematic diagram of prostate MRI after three-dimensional rendering, in which numbers 1 to 12 show schematic distribution of the plotted puncture points). A cross-sectional diagram of distribution of puncture points of prostate system is shown in FIG. 3, and positions of puncture points can be displayed intuitively to facilitate subsequent puncture.

S2: An electromagnetic sensor is bound to an ultrasound probe, a group of ultrasound sequence images are manually collected by using the ultrasound probe, and three-dimensional coordinates of four vertices of each frame of ultrasound sequence images are saved, which specifically includes the following steps:

firstly, connecting an electromagnetic positioning system and connecting the electromagnetism with the sensor, and binding the sensor to the ultrasound probe; then starting collection through program control, and continuously collecting a group of ultrasound sequence images and corresponding four vertex coordinates of each frame of images; and finally, ending the collection through the program control, and storing the collected ultrasound sequence images and the corresponding four vertex coordinates of each frame of images in a memory, as shown in FIG. 2. p3 represents an upper left vertex, p2 represents an upper right vertex, p0 represents a lower left vertex, and p1 represents a lower right vertex.

S3: Ultrasound volume data is reconstructed based on the above ultrasound data, and multi-modal registration is performed to unify a coordinate system into a world coordinate system through, which specifically includes the following steps:

performing reconstruction of the ultrasound volume data: using a following coordinate transformation formula to obtain three-dimensional coordinates corresponding to respective pixels in each frame of ultrasound sequence images based on three-dimensional coordinates and pixel coordinates of four vertices of each frame of the ultrasound sequence images, so as to obtain a three-dimensional source point cloud of the ultrasound data:

$$P(x,y,z)=Q(x,y,z)+uH(x,y,z)+vK(x,y,z),$$

where, (u, v) is a pixel coordinate of the ultrasound sequence image, P(x, y, z) is a transformed three-dimensional coordinate, Q is a three-dimensional coordinate of an upper left vertex in the ultrasound image, H is a x-direction vector of a three-dimensional space, and K is a y-direction vector of the three-dimensional space; and performing above transformation on each frame of ultrasound images and getting three-dimensional coordinates of all pixel points in respective frames of images, calculating three-dimensional coordinates corresponding to a same pixel position in both preceding and following frames of images, then transforming the three-dimensional coordinates into a voxel position, and performing interpolation on a cross section where a point cloud of the same pixel position in the preceding and following frames of images is located, so as to obtain the reconstructed ultrasound volume data.

A multi-modal registration step is performed: performing triangle mesh processing and smoothing operation on the reconstructed ultrasound volume data, and down-sampling to obtain a three-dimensional source point cloud of the reconstructed ultrasound volume data; and performing structural pairing on the three-dimensional source point cloud of the reconstructed ultrasound volume data and a three-dimensional target point cloud of the image information after MRI sequence rendering using a KNN tree, determining corresponding point pairs of the three-dimensional source point cloud and the three-dimensional target point cloud, and performing ICP iteration to complete registration, so as to obtain the registration transformation coefficient, the registration transformation coefficient including a registration rotation matrix R and a registration translation amount T, and the ultrasonic bound electromagnetic coordinate system being transformed into the MRI world coordinate system through the transformation coefficient.

Figure 6:
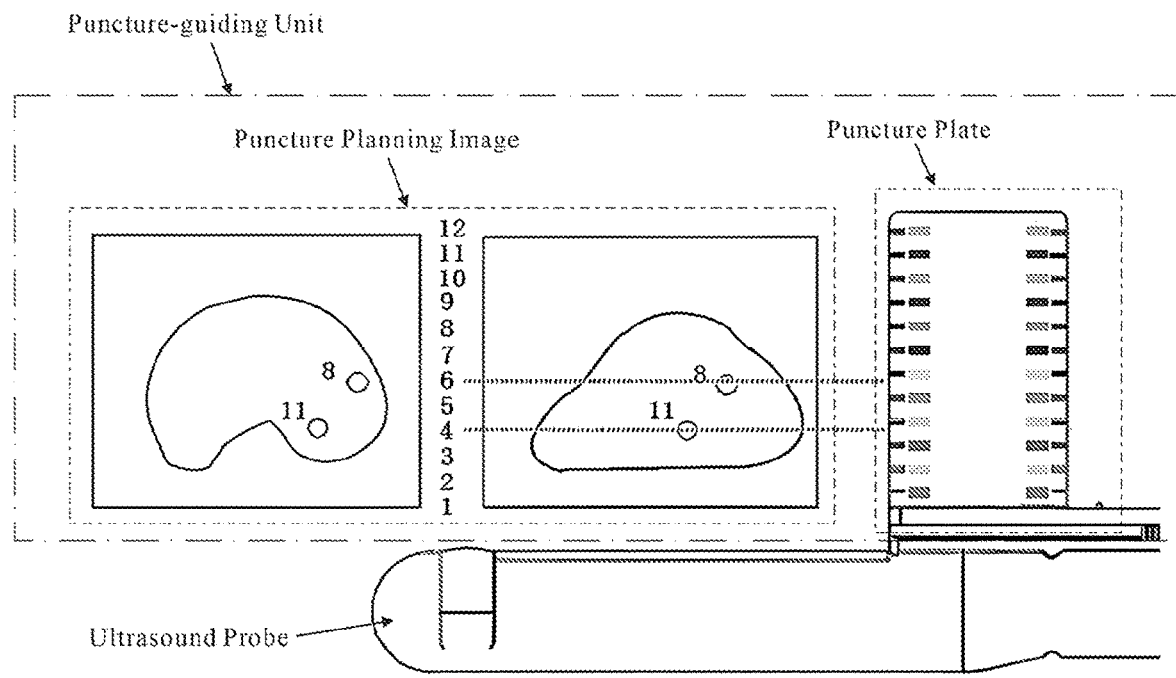
FIG. 6 is a schematic diagram of ultrasonic puncture guidance in a manner that a baffle corresponds to an ultrasonic sagittal plane in different colors.

S4: An ultrasound image of a human body acquired by an ultrasound probe is received, and a puncture guide image is generated according to a spatial position of the puncture point and a spatial position of a plane of the ultrasound probe, which specifically includes:

firstly, constructing a sphere with a radius of 1 mm and with a center of the sphere as coordinates of the puncture point for each puncture point, and uniformly sampling several points on a surface of the sphere (49 points are selected in this system);

secondly, rotating the ultrasound probe to acquire a two-dimensional ultrasound image in real time; and finally, traversing a spatial position relationship between the points on the surface of the sphere and a current plane of the probe for each puncture point, and generating the puncture guide image if the point is on the plane of the probe within a certain error range, that is, plotting a current puncture point and a puncture guide line in real time in a two-dimensional ultrasound plane (transforming puncture point MRI data into three-dimensional coordinates corresponding to the ultrasound volume data according to the registration transformation coefficient; and then projecting puncture point ultrasound volume data to a sagittal plane of the current ultrasound image according to three-dimensional coordinates of puncture point ultrasound volume data), and selecting needle access hole numbers of a puncture baffle according to the puncture guide line to realize an accurate puncture. FIG. 5 and FIG. 6 are two schematic diagrams of puncture guiding, in which the left shows distribution of the puncture points on a MRI cross section of the prostate in a plane of the ultrasound space within a certain error range, and the right shows a sagittal plane of the prostate and the puncture points projected on the cross section on a two-dimensional ultrasound sagittal plane. It can clearly show that a puncture needle enters needle access holes No. 4 and No. 6 to puncture the puncture points 11 and 8 respectively. In FIG. 5 and FIG. 6, the left shows the puncture points of the prostate (showing two puncture points) on MRI, and the right shows an ultrasound probe imaging with two puncture points in an imaging plane.

Figure 7:
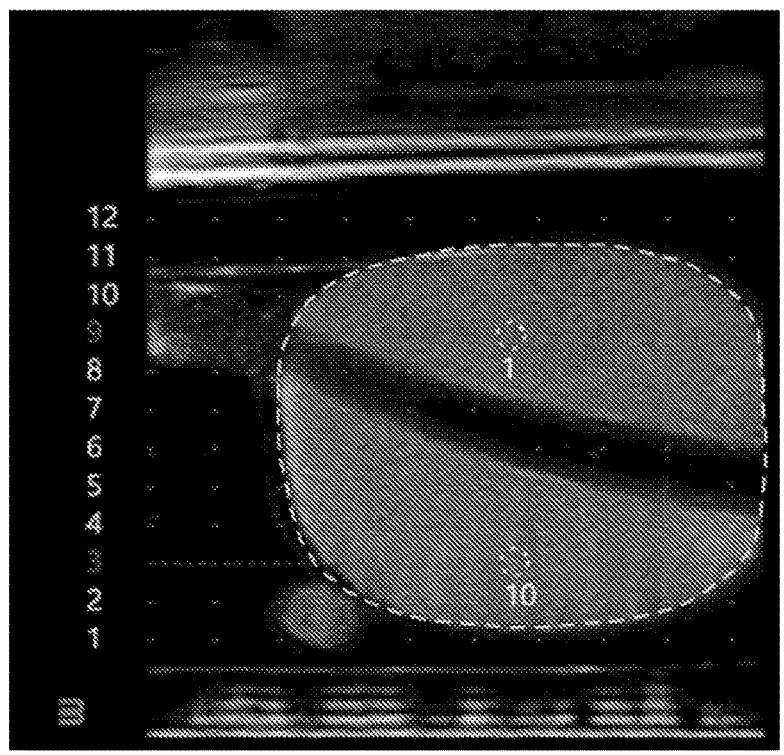
FIG. 7 is an effect diagram of ultrasonic puncture planning.

S5: The ultrasound image and a puncture planning image can be displayed according to step S4, as shown in FIG. 7.

An application layer plots a puncture rack in the ultrasound plane in proportion, in which the puncture points are marked with yellow circles, and the punctured hole numbers and the puncture guide line are marked with red colors, which can clearly show that the current puncture needle enters the needle access holes No. 9 and No. 3 to puncture the puncture points 1 and 10 respectively. Finally, the puncture positions and the puncture line overlap in the ultrasound image plane, and a whole puncture process is completed quickly, efficiently and accurately.

When the system receives the real-time ultrasound images of the human body acquired by the ultrasound probe in real time and executes the puncture planning unit for puncture planning, it can display the ultrasound image and the puncture planning image in real time.

According to the system of the present invention, an electromagnetic coordinate system under ultrasound is unified to a MRI world coordinate system through multi-modal medical image registration, and is switched to the MRI coordinate system through a real-time ultrasonic section, and it is determined whether the puncture point is on the ultrasound plane so as to guide the ultrasound for accurate puncture. As a result, precision of puncture guidance is further improved, which can assist doctors to puncture a lesion target faster and effectively reduce puncture time and incidence of complications.

Embodiments of the present invention have been described above, and the above description is illustrative, not exhaustive, and is not limited to the disclosed embodiments. Many modifications and changes are obvious to those skilled in the art without departing from the scope and spirit of the illustrated embodiments.

What is claimed is:

1. A method for an ultrasonic puncture guidance planning system based on a multi-modal medical image registration, comprising:

(a) receiving magnetic resonance imaging (MRI) sequence images of a human body, performing three-dimensional rendering on the MRI sequence images and plotting a puncture point;

(b) receiving ultrasound sequence images of the human body, extracting three-dimensional coordinates of four vertices of each frame of the ultrasound sequence images, and reconstructing ultrasound volume data;

(c) performing, by using an Iterative Closest Point (ICP) iterative algorithm, a three-dimensional registration operation on (i) the ultrasound volume data reconstructed in step (b) and (ii) the MRI data rendered in step (a) to obtain a registration transformation coefficient that transforms three-dimensional coordinates corresponding to ultrasound data into three-dimensional coordinates corresponding to MRI data, wherein the registration operation comprises (1) performing triangle-mesh processing and smoothing on the reconstructed ultrasound volume data and down-sampling to obtain a three-dimensional source point cloud of the reconstructed ultrasound volume data, and (2) performing structural pairing on the three-dimensional source point cloud and three-dimensional target point cloud of the MRI-rendered data using a K-Nearest Neighbor (KNN) tree, determining corresponding point pairs, and executing the ICP iterative algorithm to complete registration, thereby obtaining a registration rotation matrix R and a registration translation amount T; and (d) receiving ultrasound images of the human body acquired by an ultrasound probe, and generating and displaying a puncture planning image based on a system puncture point and a current ultrasound image.

2. The method of claim 1, wherein step (a) comprises (i) acquiring the MRI sequence images using magnetic resonance imaging equipment; (ii) performing three-dimensional reconstruction and rendering on the MRI sequence images on the basis of patient position information contained in digital imaging and communications in medicine (DICOM) data; and (iii) plotting the puncture point on the rendered image information.

3. The method of claim 2, wherein plotting the puncture point in step (a) comprises (i) plotting twelve system puncture points that are evenly distributed on the rendered MRI image information; and (ii) when a suspected lesion is present, additionally plotting a targeted puncture point at the lesion location.

4. The method of claim 3, further comprising repeatedly performing steps (b) through (d) for consecutively acquire, real-time ultrasound images and concurrently displaying each ultrasound image together with its corresponding puncture planning images.

5. The method of claim 2, further comprising repeatedly performing steps (b) through (d) for consecutively acquired real-time ultrasound images and concurrently displaying each ultrasound image together with its corresponding puncture planning images.

6. The method of claim 1, wherein step (b) comprises (i) manually rotating an ultrasound probe to collect the ultrasound sequence images; and (ii) for each collected image, obtaining the three-dimensional coordinates of the four vertices of images using an electromagnetic sensor affixed to the probe in cooperation with an electromagnetic positioning system.

7. The method of claim 6, further comprising providing, at a handle of the ultrasound probe, a puncture plate having a plurality of evenly arranged needle access holes sized to cover a puncture organ; and overlaying, on an ultrasound sequence image, numbers that correspond to the actual positions and spacings of the respective on the puncture plate.

8. The method of claim 6, wherein the step (c) of reconstructing ultrasound volume data comprises:
(i) applying the coordinate transformation formula to every pixel coordinate (u, v) of each ultrasound image frame to obtain corresponding three dimensional coordinates:

$$P(x,y,z)=Q(x,y,z)+uH(x,y,z)+vK(x,y,z),$$

wherein, (u, v) is a pixel coordinate of the ultrasound sequence image, P(x, y, z) is a transformed three-dimensional coordinate, Q is a three-dimensional coordinate of an upper left vertex in the ultrasound image, H is a x-direction vector of a three-dimensional space, and K is a y-direction vector of the three-dimensional space;
(ii) transforming each three-dimensional coordinate into a voxel position; and
(iii) interpolating a cross section that contains point clouds for the same pixel position in preceding and subsequent frames.

9. The method of claim 8, further comprising repeatedly performing steps (b) through (d) for consecutively acquired real-time ultrasound images and concurrently displaying each ultrasound image together with its corresponding puncture planning image.

10. The method of claim 6, further comprising repeatedly performing steps (b) through (d) for consecutively acquired real-time ultrasound images and concurrently displaying each ultrasound image together with its corresponding puncture planning image.

11. The method of claim 1, further comprising providing, at a handle of the ultrasound probe, a puncture plate having a plurality of evenly arranged needle access holes sized to cover a puncture organ.

12. The method of claim 11, further comprising repeatedly performing steps (b) through (d) for consecutively acquired, real-time ultrasound images and concurrently displaying each ultrasound image together with its corresponding puncture planning image.

13. The method of claim 1, further comprising, prior to generating the puncture planning image in step (d):
(i) for each system puncture point, constructing a sphere with a radius of r centered at the puncture point, and uniformly sampling a plurality of points on a surface of the sphere; and
(ii) determining, for each system puncture point, whether any sampling point lies on the current probe plane by calculating a cosine value of an angle between (a) a vector extending from the upper-left vertex of the current ultrasound image to the sampling point and (b) a normal vector of the probe plane, and identifying the puncture point as lying on the current ultrasound image when the absolute value of the cosine is less than a threshold between 0.01 and 0.02.

14. The method of claim 13, wherein step (d) further comprises, for a puncture point identified as lying on an ultrasound image:
(i) transforming the puncture point from MRI coordinates to ultrasound volume coordinates using the registration transformation coefficient;
(ii) calculating, for the transformed puncture point $P_i(x, y, z)$, a direction vector vec (x−x0, y−y0, z−z0) to the upper left vertex p3(x0, y0, z0) of the current ultrasound image, wherein i represents a number of the puncture point;
(iii) a projecting the direction vector onto an ultrasound plane x-axis H to obtain a physical distance value as Value=vec·H, H being a unit vector of the ultrasound plane in the x direction;
(iv) converting the physical distance to pixel coordinate X=Value/pixelSpace, wherein pixelSpace is an ultrasonic pixel spacing; and
(v) calculating a projection coordinate y along the ultrasound plane y-axis in a same way as step (iii) above.

15. The method of claim 14, further comprising repeatedly performing steps (b) through (d) for consecutively acquired real-time ultrasound images and concurrently displaying each ultrasound image together with its corresponding puncture planning image.

16. The method of claim 13, further comprising repeatedly performing steps (b) through (d) for consecutively acquired real-time ultrasound images and concurrently displaying each ultrasound image together with its corresponding puncture planning image.

17. The method of claim 1, further comprising repeatedly performing steps (b) through (d) for consecutively acquired real-time ultrasound images and concurrently displaying each ultrasound image together with its corresponding puncture planning images.

* * * * *